United States Patent
Gylov et al.

[11] Patent Number: 5,860,591
[45] Date of Patent: Jan. 19, 1999

[54] VALVE FOR A SYSTEM HAVING AN ENERGY-CARRYING MEDIUM

[75] Inventors: Hans Henrik Gylov, Holte; Ole Joergensen; Carsten Moeller, both of Slagelse, all of Denmark

[73] Assignee: Frese Armatur A/S, Slagelse, Denmark

[21] Appl. No.: 821,842

[22] Filed: Mar. 21, 1997

[30] Foreign Application Priority Data

Sep. 23, 1994 [DK] Denmark ............................. 1099/94

[51] Int. Cl.$^6$ ............................................. G05D 23/12
[52] U.S. Cl. ............................................. 236/42; 236/92 R
[58] Field of Search ............................. 36/42, 43, 92 R

[56] References Cited

U.S. PATENT DOCUMENTS

| | | | |
|---|---|---|---|
| 3,838,812 | 10/1974 | Johnson | 236/42 |
| 4,336,903 | 6/1982 | Ziprs | 236/92 R |
| 4,596,360 | 6/1986 | Cohen | 236/92 R |
| 4,621,767 | 11/1986 | Denneny, Jr. et al. | 236/92 R |
| 4,777,794 | 10/1988 | Nielsen | 236/92 R |
| 5,178,324 | 1/1993 | Moesby | 237/8 R |

FOREIGN PATENT DOCUMENTS 26 15 895  10/1977  Germany .

*Primary Examiner*—William E. Tapoical
*Attorney, Agent, or Firm*—Pennie & Edmonds LLP

[57] ABSTRACT

Energy exchanger, valve (8) with thermostat valve (12), a housing (9) with inlet (15) and outlet (16), a thermostat bellows displaceable spindle (42) with a seal (32) which, against the pressure of a spring (43) surrounding the spindle (42), closes/opens an opening (28) in a transverse wall (29) in the housing (9) between the inlet (15) and the outlet (16), and a membrane (17, 21) controlled by the differential pressure for the control of an energy-carrying medium between the inlet (15) and the outlet (16), and an adjustable closing element (11) between the inlet (15) and the membrane (17, 21), the thermostat valve (12) being able to shut off the flow between the inlet (15) and the outlet (16) independently of the closing element (11). With the valve (8), only a predetermined maximum amount of the medium flows through the energy exchangers (5). If the differential pressure increases upon the closing of one or more valves on a pipe length, the flow in the individual energy exchanger (5) is not increased.

6 Claims, 2 Drawing Sheets

VALVE FOR A SYSTEM HAVING AN ENERGY-CARRYING MEDIUM

CROSS-REFERENCE TO RELATED APPLICATIONS

This is a continuation-in-part application of International Application PCT/DK95/00374, which has an international filing date of Sep. 19, 1995.

BACKGROUND OF THE INVENTION

This invention concerns a valve for a system having an energy-carrying medium which flows through a number of energy exchangers in the system, said valve having a thermostat valve with a housing comprising an inlet and an outlet, a spindle with a seal which can be displaced by a thermostat bellows and which, depending on the expansion/contraction of the thermostat bellows and against the force of a spring which surrounds the spindle, can respectively close and open an opening with a seating in a transverse wall in the housing between the inlet and the outlet.

The plant may for example be a circulation plant where the fluid medium after being heated gives off energy to or after being cooled takes up energy from the surroundings or to/from a secondary fluid medium through at least one energy exchanger or a similar object. Such plants are generally called heating plants or cooling plants (air-conditioning), respectively.

A central heating plant with a similar valve is known from U.S. Pat. No. 5,178,324, said plant being configured in such a manner that it is possible to control the flow in the entire plant, a single part of the plant or in several zone-divided sections of the plant.

This plant comprises several energy exchangers each provided with its own valve, said energy exchangers being intended to be placed in a number of at least one in each room in a building, and where the valves are disposed in the piping of the plant.

In central energizing plants it is important that the water is distributed through the plant in a pre-calculated proportion so that the dimensioned energy requirements of the individual energy exchangers are taken into consideration.

It is also important that the energy-carrying liquid remains in the energy exchangers for a period of time which is long enough to allow a reasonable amount of energy to be dissipated in the rooms of the building which are to be energized by the energy exchangers, which can be ensured by means of a differential pressure valve placed in the individual branches of the plant, in that this valve can regulate the flow of the energy-carrying fluid.

Furthermore, it is important that the differential pressure across the individual energy exchangers is so low that noise does not arise in the valves, in that such noise can cause inconvenience, either directly or by transmission through the piping system.

In the individual rooms, the flow of energy-carrying liquid through the energy exchangers or each of the energy exchangers can be controlled by means of thermostatic valves which, depending on the temperature in the room, can open more or less to allow flow through the energy exchanger(s) so that the emission of energy to the rooms can be held within those limits which are determined by the accuracy of the thermostatic valves, and by the temperature which the user of the room desires to maintain by the adjustment of the thermostatic valve or valves.

When ordinary thermostatic valves are mounted in a length of piping which leads the energy-carrying medium from an energy exchanger to the subsequent energy exchangers, each of these thermostatic valves will be dependent on the others. Thus if ten thermostatic valves are mounted in a length of piping, and nine of these are closed, the differential pressure across the open valve will be increased. This results in an increase in the flow through the associated energy exchanger, and the increased flow can also give rise to disturbing noise.

This situation can arise, for example, at times of the year when the incidence of sunlight makes energizing unnecessary. If there is also opened a window in that room in which the open thermostatic valve is mounted, the associated energy exchanger will receive a considerably greater flow than would otherwise be the case.

It is also difficult to achieve a mutual balance between the individual pipes in the building, the reason being that the flow will change depending on the differential pressure. Today, this drawback is overcome by providing each length of piping with an extra valve which is carefully adjusted to ensure the balance between the individual pipes.

BRIEF DESCRIPTION OF THE INVENTION

The object of the present invention is therefore to improve a valve of the kind described so that the above-mentioned drawbacks of an energizing plant can be avoided.

This object is achieved by means of a valve of the above-mentioned kind, said valve according to the invention being characteristic in that the valve is further provided with a membrane which is controlled by a differential pressure for the regulation of the differential pressure of the energy-carrying medium across an adjustable pre-setting, and the thermostatic valve consisting of the seating and the seal between the inlet and the membrane, and that the thermostatic valve is arranged to be able to cut off the flow between the inlet and the outlet independently of the adjustable pre-setting.

The membrane in the valve according to the invention thus maintains a constant differential pressure across the adjustable pre-setting and across the seating and the seal together.

It is hereby achieved that the valve according to the invention can be adjusted to allow only a predetermined maximum amount of the energy-carrying medium to flow through the valve independently of the remaining energy exchangers and pressure conditions in the system. If the differential pressure is increased, for example because one or more of the remaining valves on a length of piping are closed, this will not result in an increase in the flow through the individual energy exchanger.

Moreover, in certain cases a reduction in noise can be achieved, in that the pressure/flow is reduced in three steps, whereas in the ordinary thermostatic valves this is effected in one or two steps.

Furthermore, it will not be necessary to mount an extra valve in order to mutually balance the individual pipe lengths.

The dependent claims disclose expedient arrangements of the valve according to the invention.

BRIEF DESCRIPTION OF THE DRAWINGS

In the following, the valve according to the invention will be described in more detail with reference to the drawing, where FIG. 1 schematically shows a commonly known, double pipe energizing plant.

DETAILED DESCRIPTION OF THE INVENTION

Figure 1:
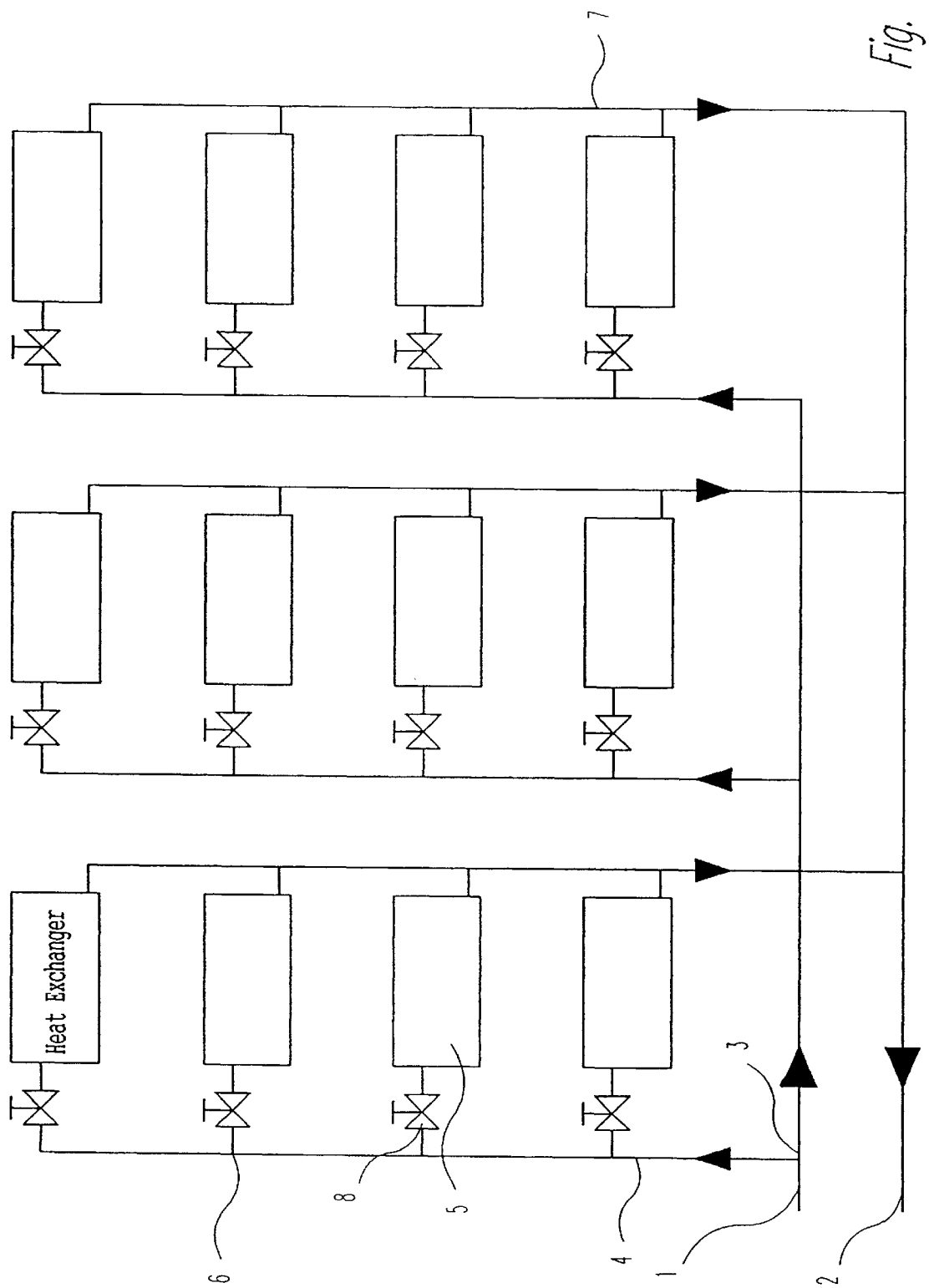

In FIG. 1 is shown a double-pipe energizing plant, one pipe of which is the main pipe 1 which leads the energy-carrying medium, such as water, from a source of energy, which is not shown, in the energizing plant, and the second pipe is a return pipe 2 which leads the medium back to the boiler.

From a branch point 3 there extends a first side pipe 4 which leads the medium forward to a number of energy exchangers 5, each of which is connected to the first side pipe 4 at connection points 6 and to the second side pipe 7 which leads the medium back to the return pipe 2.

Each energy exchanger 5 is provided with a valve 8 according to the invention, which is arranged to control the flow of the energy-carrying medium through the respective energy exchangers 5.

Figure 2:
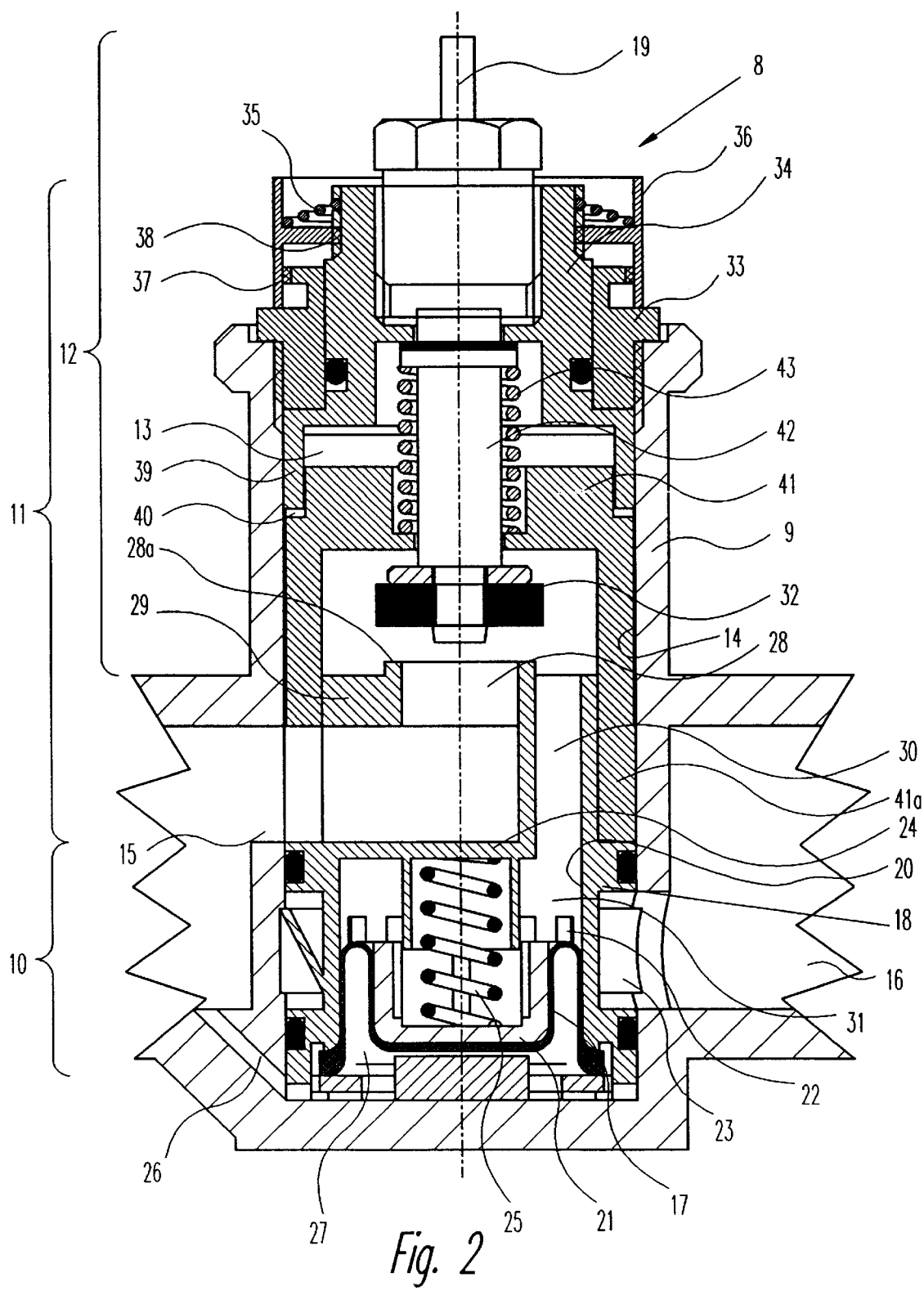
FIG. 2 shows a section through an embodiment of the valve according to the invention.

An embodiment of a valve 8 according to the invention is shown in FIG. 2, and consists of a housing 9, which contains a combination of a differential pressure valve 10, an adjustable pre-setting 11 and a thermostat valve 12, all said three parts 10, 11 and 12 being in themselves of known constructions.

The housing 9 has a longitudinal bore 13 with an internal wall 14, and transversly hereto an inlet 15 and an outlet 16 for the medium.

The differential pressure valve 10 comprises a membrane mechanism with a membrane 17 or bellows of flexible material which is disposed in a first bush 18 which is placed in the bore 13 which lies coaxially in the axis 19 of the housing 9.

The membrane 17 can be described as being a short tube, one end of which at a radial distance is turned back over the other end, after which the radial outer part is firmly secured to an internal wall 20 in the first bush 18. The radial innermost part of the membrane 17 is secured to a disk or cup 21. By displacement of the cup forwards and backwards in the direction of the axis 19 of the housing 9, the membrane will more or less fold in on itself, whereby the the radial outer part can be longer or shorter and thereby roll in over a number of slots 22 which extend axially and are distributed along the circumference of the first bush 18.

The first bush 18 has an annular recess 23 opposite the slots 23. Between a first transverse wall 24 and the cup 21 there is inserted a helical spring 25. A first channel 26 leads from the inlet 15 to a chamber 27 under the membrane 17.

From FIG. 2 it will be clear that a medium which is led in through the inlet 15 will flow through the first channel 26 and exercise a force against the upper side of the membrane 17 in the chamber 27, so that the cup 21 compresses the spring 25.

From the inlet 15, the medium can also flow through an opening 28 with a seating 28a which is configured in a second transverse wall 29 in the first bush 18, and flow further through at least one longitudinal, second channel 30 which extends to a chamber 31 in which the slots 22 are placed.

By a suitable dimensioning of the area of the membrane 17 in relation to the pressure of the spring 25, with a rolling in of the membrane over the slots 22 a desired differential pressure can be generated across the pre-setting 11 and a closing element consisting of the seating 28a and a herewith cooperating seal 32 (see later).

The adjustable pre-setting 11 can be set for a certain through-flow opening by turning around the axis 19, and can thereafter be locked firmly in its setting. For example, it can be configured in the following manner:

In one end of the housing, in the bore 13 there is screwed a threaded bush 33 in which a locking element 34 is secured in a substantially indisplaceable manner in the direction of the axis 19 of the housing 9, but is able to be turned around said axis. The locking element 34 is secured against the pressure of a spring 35 which is compressed between a flange at the free end of the locking element 34 and a surface on a bush-shaped setting element 36 at the free end of the threaded bush 33. In a radial plane, the threaded bush 33 and the setting element 36 have cooperating teeth 37 which extend for a short distance radially. In a locking position for the setting element 36 brought about by the spring 35, the teeth 37 prevent a relative rotation of the parts 33, 36, whereby the locking element 34 is also prevented from turning. On the other hand, in a second position where the setting element 36 against the pressure of the conical spring 35 is drawn out axially in relation to the threaded bush 33, the engagement between the teeth 37 is terminated. In a second radial plane there are cooperating teeth 38 on the setting element 36 and the locking element 34, whereby the setting element 36 can turn the locking element 34 in the housing 9 when the setting element 36 is drawn axially out of the threaded bush 33, in that the teeth 38 have sufficient axial extension for this purpose.

The end of the locking element 34 which faces towards the inside of the housing 9 has axially-projecting pegs 39 which engage in tracks 40 in a cup-shaped bush 41, so that the bush 41 can be turned in the bore 13 by means of the locking element 34 when this is turned by means of the setting element 36.

The edge on the mouth of the cup-shaped bush 41, for example for a half of the circumference, is cut off in such a manner that the remaining half 41a of the edge extends beyond the inlet 15 in the housing 9, and closes this when the locking element 34 is turned to a position in which said half part 41a on the cup-shaped bush 41 is opposite the inlet 15. By a turning of less than 180° of the locking element 34 and the cup-shaped bush 41 around their longitudinal axes, which coincide with the longitudinal axis 19 of the housing 9, there can be opened for partial flow through the inlet 15, and by a turning of 180° to the position shown in FIG. 2, there can be opened to full extent for said flow.

With this construction the pre-setting 11 can be set by first drawing the setting element 36 axially out of the threaded bush 36, and thereafter by turning the setting element 36 to a desired angle around the axis 19 of the housing 9, whereby the cup-shaped bush 41 is also turned as a consequence of the engagement between the pegs 39 and the tracks 40, so that the area of the through-flow opening at the inlet 15 is regulated to the desired size.

The thermostatic valve 12 is of a commonly known construction. The cup-shaped bush 41 and the locking element 34 are disposed around a spindle 42 which is surrounded by a helical spring 42, which with its one end abuts against the locking element 34 in the housing 9 and with its other end against the bottom of the cup-shaped bush 41.

Outside the housing 9, the spindle 42 is connected to a thermostat bellows (not shown in the drawing) which, depending on the temperature of the surroundings, can displace the spindle 42 in its longitudinal direction against the pressure from the spring 43. Inside the cup-shaped bush 41 the spindle 42 also has the above-mentioned seal 32, which by contact against the seating 28a can close the opening 28 in the transverse wall 29 of the first bush 18, regardless of the setting of the differential pressure valve 10 and the adjustable pre-setting 11.

What is claimed is:

1. Valve for a system having an energy-carrying medium which flows through a number of energy exchangers (5) in the system, said valve (8) having a thermostat valve (12) with a housing (9) comprising an inlet (15) and an outlet (16), a spindle (42) which can be displaced by a thermostat bellows and having a seal (32), and which depending on the expansion/contraction of the thermostat bellows and against the pressure of a spring (43) which surrounds the spindle (42) can respectively close and open an opening (28) with a seating (28a) in a transverse wall (29) in the housing (9) between the inlet (15) and the outlet (16), where the valve (8) also has a differential pressure controlled membrane (17, 21) for the regulation of the differential pressure of the energy-carrying medium across an adjustable pre-setting (11) and the thermostat valve (12) consisting of the seating (28a) and the seal (32) between the inlet (15) and the membrane (17, 21), and that the thermostat valve (12) is arranged to be able to cut off the flow between the inlet (15) and the outlet (16) independently of the adjustable pre-setting (11), and the membrane (17) of the differential pressure valve (10) is placed in a first bush (18) which is disposed in the housing (9) and suspended coaxially around the axis (19) of same, that a spring (25) is provided between the membrane (17) and the bottom of the first bush (18), that a first channel (26) from the inlet (15) leads to the upper side of the membrane (17), that at least one second channel (30) leads from the opening (28) to the underside of the membrane (17), which is arranged to be able to roll in over slots (22) in the first bush (18) for at least a partial closing of the slots (22), and in that the housing (9) opposite the slots (22) has an annular recess (23) which is open towards the outlet (16), an improvement, comprising:

the valve wherein the housing (9), and suspended coaxially around the axis (19) of same, the adjustable pre-setting (11) comprises a cup-shaped bush (41), the mouth of which has an edge which is cut off in such a manner that a remaining half (41a) can extend beyond the inlet (15) in a given turned position of the cup-shaped bush (41).

2. The valve according to claim 1, wherein a locking element (34) is secured in an indisplaceable manner in the direction of the axis (19) of the housing (9), but rotatable around the axis (19) by one end of a screwed-in threaded bush (33) in the housing (9), that the threaded bush (33) is surrounded by a setting element (36), that in a radial plane of the threaded bush (33) and the setting element (36) there are cooperating teeth (37) with a small axial extension which, in the locking position for the setting element (36), prevent mutual rotation between the threaded bush (33) and the setting element (36), and in that the locking element (34) and the setting element (36) in a second axial plane have cooperating teeth (38), where the teeth on the locking element (34) have a predetermined radial length so that the setting element (36), in a second position withdrawn from the locking position, can turn the locking element (34) in the housing (9).

3. The valve according to claim 2, wherein the locking element (34) has axially-projecting pegs (39) which engage in tracks in the circumference of the cup-shaped bush (41).

4. The valve according to claim 2, wherein the setting element (36) is held in the locking position by a spring (35) which is inserted between a flange on the free end of the locking element (34) and a contact surface on the setting element (36).

5. The valve according to claim 3, wherein the setting element (36) is held in the locking position by a spring (35) which is inserted between a flange on the free end of the locking element (34) and a contact surface on the setting element (36).

6. The valve according to claim 1, wherein the thermostat valve (12) comprises a spindle (42) which extends through a cup-shaped bush (41) and a locking element (34), that the spindle (42) is surrounded by a spring (43) which is compressed between the locking element (34) and the bottom of the cup-shaped bush (41), and in that on the end which projects inside the cup-shaped bush (41), the spindle (42) has the said seal (32) which is arranged to lie up against the seating (28a) and close the opening (28).

* * * * *

UNITED STATES PATENT AND TRADEMARK OFFICE
CERTIFICATE OF CORRECTION

PATENT NO. : 5,860,591

DATED : January 19, 1999

INVENTORS : Hans Henrick Gylov et al.

It is certified that error appears in the above-identified patent and that said Letters Patent is hereby corrected as shown below:

On the title page, insert:

--Continuing Application Data

[63] Continuation-in-part of PCT/DK95/00374, Sept. 19, 1995.--

Signed and Sealed this

Twenty-fifth Day of May, 1999

*Attest:*

Q. TODD DICKINSON

*Attesting Officer*     *Acting Commissioner of Patents and Trademarks*